(12) United States Patent
Agnew et al.

(10) Patent No.: US 7,422,820 B2
(45) Date of Patent: Sep. 9, 2008

(54) SOLID OXIDE FUEL CELL STACK

(75) Inventors: Gerard D Agnew, Derby (GB); Nigel T Hart, Derby (GB); Michael J Oakely, Derby (GB); Mark N Pashley, Derby (GB); Eric W Dean, Derby (GB)

(73) Assignee: Rolls-Royce plc, London (GB)

( * ) Notice: Subject to any disclaimer, the term of this patent is extended or adjusted under 35 U.S.C. 154(b) by 513 days.

(21) Appl. No.: 10/760,409

(22) Filed: Jan. 21, 2004

(65) Prior Publication Data

US 2004/0166390 A1   Aug. 26, 2004

Related U.S. Application Data

(63) Continuation of application No. PCT/GB02/03196, filed on Jul. 11, 2002.

(51) Int. Cl.
*H01M 2/14* (2006.01)

(52) U.S. Cl. .......................................... 429/38; 429/39

(58) Field of Classification Search .................... 429/34, 429/38, 39
See application file for complete search history.

(56) References Cited

U.S. PATENT DOCUMENTS

| | | | | |
|---|---|---|---|---|
| 3,861,959 | A | | 1/1975 | Cadiou |
| 5,175,063 | A | * | 12/1992 | Ishihara et al. ............... 429/32 |
| 5,270,129 | A | * | 12/1993 | Ishida ........................ 429/32 |
| 5,413,878 | A | * | 5/1995 | Williams et al. .............. 429/16 |
| 5,486,428 | A | * | 1/1996 | Gardner et al. ............... 429/19 |
| 5,712,055 | A | * | 1/1998 | Khandkar et al. ............. 429/31 |
| 6,007,932 | A | | 12/1999 | Steyn |
| 6,054,228 | A | | 4/2000 | Cisar et al. |

FOREIGN PATENT DOCUMENTS

| | | |
|---|---|---|
| DE | 196 36 903 P | 1/1998 |
| EP | 0 419 163 A | 3/1991 |
| EP | 0 668 622 A | 8/1995 |

* cited by examiner

*Primary Examiner*—Patrick Ryan
*Assistant Examiner*—Julian Mercado
(74) *Attorney, Agent, or Firm*—W. Warren Taltavull; Manelli Denison & Selter PLLC

(57) ABSTRACT

A solid oxide fuel cell stack (10) comprises a plurality of modules (12). Each module (12) comprises an elongate hollow member (14). Each hollow member (14) has at least one passage (32) extending longitudinally through the hollow member (14) for the flow of reactant. Each hollow member (14) has two parallel flat surfaces (16,18). At least one of the modules (12A, 12B, 12C) includes a plurality of solid oxide fuel cells (20). The solid oxide fuel cells (20) are arranged on the flat surfaces (16,18) of the modules (12A, 12B, 12C). At least one end (34) of each module (12) is connected to an end (36) of an adjacent module (12) to allow reactant to flow sequentially through the modules (12). The arrangement of the modules (12) provides compliance in the solid oxide fuel cell stack (10) and thermal and mechanical stresses in the solid oxide fuel cell stack (10) are reduced.

31 Claims, 4 Drawing Sheets

SOLID OXIDE FUEL CELL STACK

The application is a continuation of international Application Number PCT/GB2002/003196 filed Jul. 11, 2002, designating the United States.

FIELD OF THE INVENTION

The present invention relates to a solid oxide fuel cell stack.

BACKGROUND OF THE INVENTION

The main variants of the solid oxide fuel cell are the tubular solid oxide fuel cell (T-SOFC), the planar solid oxide fuel cell (P-SOFC) and the monolithic solid oxide fuel cell (M-SOFC).

The tubular solid oxide fuel cell comprises a tubular solid oxide electrolyte member, which has inner and outer electrodes.

The monolithic solid oxide fuel cell has two variants. The first variant has a planar solid oxide electrolyte member, which has electrodes on its two major surfaces. The second variant has a corrugated solid oxide electrolyte member, which has electrodes on its two major surfaces.

Our European patent EP0668622B1 disclose a novel solid oxide fuel cell, which comprises a plurality of modules. Some of these modules comprise hollow members, which have two parallel flat surfaces upon which the solid oxide fuel cells are arranged. The opposite ends of each module are connected to reactant manifolds by compliant bellows connections.

However, such an arrangement does not provide sufficient thermal and mechanical compliance in the solid oxide fuel cell stack to minimise the mechanical and thermal stresses in the solid oxide fuel cell stack.

SUMMARY OF THE INVENTION

Accordingly the present invention seeks to provide a novel solid oxide fuel stack which reduces, preferably overcomes, the above mentioned problems.

Accordingly the present invention provides a solid oxide fuel cell stack comprising a plurality of modules, each module comprising an elongate hollow member, each hollow member having at least one passage extending longitudinally through the hollow member for the flow of a reactant, each hollow member having two parallel flat surfaces, at least one of the modules including a plurality of solid oxide fuel cells, the solid oxide fuel cells being arranged on at least one of the flat surfaces of the at least one module, the surfaces of adjacent modules being arranged substantially parallel and spaced apart, at least one end of each module being connected to an end of an adjacent module to allow reactant to flow sequentially through the modules and thermal and mechanical stresses in the solid oxide fuel cell stack are reduced.

Preferably the solid oxide fuel cell stack comprises a manifold for the supply of a reactant and a manifold for the removal of the reactant, each module having a first end and a second end, the first end of a first one of the modules being connected to the manifold for the supply of reactant to the first one of the modules, the second end of a second one of the modules being connected to the manifold for the removal of reactant from the second one of the modules, the second end of the first one of the modules being connected to the first end of an adjacent module, the first end of the second one of the modules being connected to the second end of an adjacent module.

The second end of the first one of the modules may be connected to the first end of the second one of the modules.

Preferably each hollow member has a plurality of passages.

At least one hollow member may have a different length to the remainder of the hollow members.

Preferably the at least one module includes a plurality of fuel cells on both of the flat surfaces of the module.

Each module may include a plurality of solid oxide fuel cells.

At least one of the modules may comprise a heat exchanger.

At least one of the modules may comprise a fuel reformer. The at least one module may have a catalyst arranged in the at least one passage through the hollow member. The catalyst may be arranged on the surfaces of the at least one passage through the hollow member.

A member may be arranged in the at least one passage through the hollow member. The member may be a coil of wire. The member may be arranged and configured to define a helical flow path through the passage with the hollow member. A catalyst may be arranged on the member.

Each module may be connected to an adjacent module by an end cap.

Each module may be connected to an adjacent module by a spacer. The spacer may comprise a ceramic washer or a metallic washer.

Preferably the solid oxide fuel cell stack comprises up to twenty modules. Preferably the modules have a length of 50 mm to 2000 mm. Preferably the modules have a width of 20 mm to 300 mm. Preferably the modules have a thickness of up to 30 mm, more preferably the modules have a thickness of up to 10 mm.

The centre lines of adjacent modules may be arranged substantially in the same plane to form an undulating arrangement of modules.

Alternatively the centre lines of adjacent modules may be arranged in different planes to form a helical arrangement of modules. The centre lines of adjacent modules may be arranged perpendicularly. The centre lines of adjacent modules may be arranged at an angle of 45°, 52° or 60°.

Preferably at least one damping member is arranged between adjacent modules. The damping member may be a resilient corrugated member or the damping member may be a resilient C shaped member.

Preferably each solid oxide fuel cell comprises an anode electrode, a cathode electrode and a solid oxide electrolyte.

Preferably the anode electrodes are arranged on the flat surfaces of the elongate hollow member.

The at least one passage of at least one of the elongate hollow members may have a varying cross-sectional area throughout its length. The at least one passage may be a converging passage or a diverging passage.

BRIEF DESCRIPTION OF THE DRAWINGS

The present invention will be more fully described by way of example with reference to the accompanying drawings in which.

DETAILED DESCRIPTION OF THE INVENTION

Figure 1:
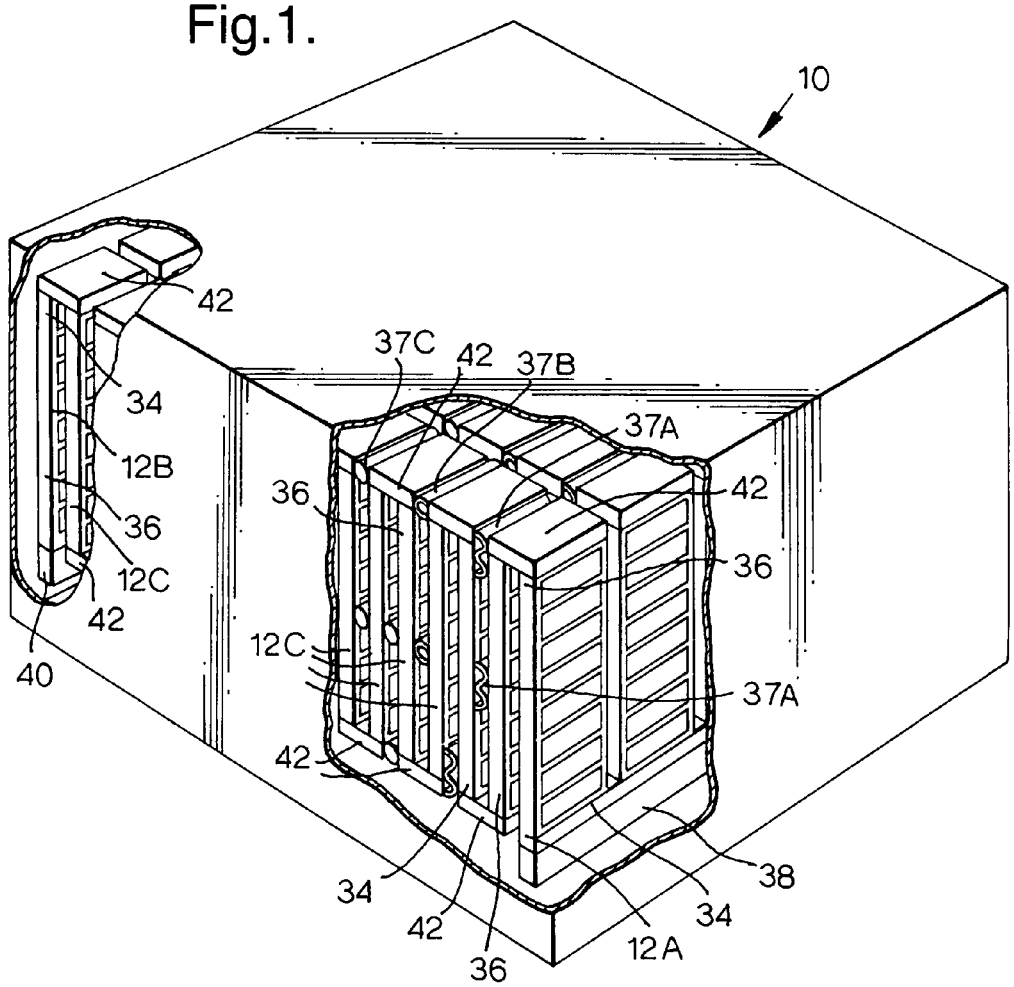
FIG. 1 is a partially cut away perspective view of a solid oxide fuel cell stack according to the present invention.

A solid oxide fuel cell stack 10 according to the present inventions is shown in FIGS. 1 to 5. The solid oxide fuel cell stack 10 comprises a plurality of modules 12 arranged within a casing 13. Each module 12 comprises an elongate hollow member 14. The hollow members 14 are manufactured from fully or partially stabilised zirconia, alumina, silicon carbide, magnesia doped magnesia aluminate or other suitable ceramic material. Each hollow member 14 has two parallel surfaces 16 and 18 upon which are arranged solid oxide fuel cells 20. The hollow members 14 are porous to allow fuel to flow to the solid oxide fuel cells 20.

Figure 2:
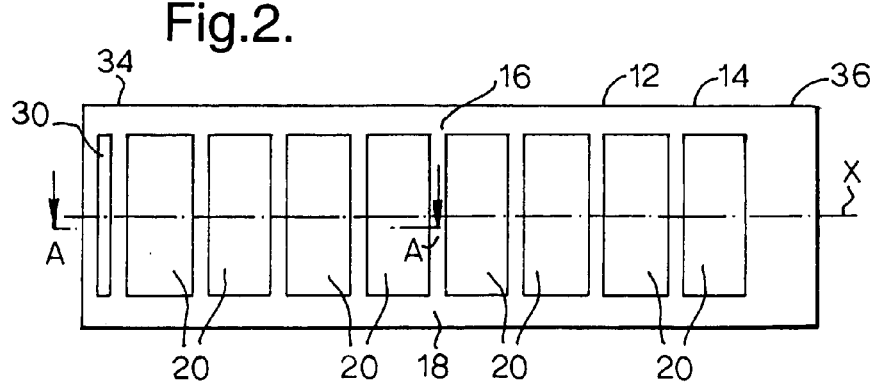
FIG. 2 is a side elevation of one module of the solid oxide fuel cell stack shown in FIG. 1.
Figure 3:
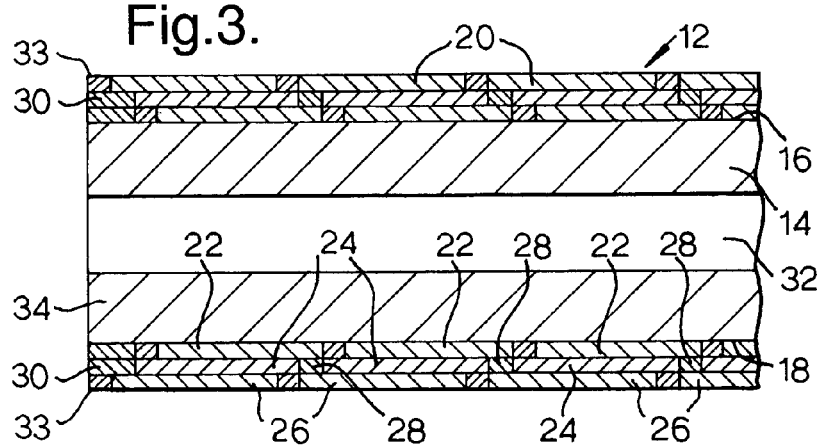
FIG. 3 is a partial cross-sectional view through the module shown in FIG. 2.

The solid oxide fuel cells 20, as shown in FIGS. 2 and 3, are spaced apart longitudinally along the surfaces 16 and 18 and the solid oxide fuel cells 20 on each of the surfaces 16 and 18 are electrically connected in series.

Each solid oxide fuel cell 20, as shown in FIG. 3, comprises an anode electrode 22, a solid oxide electrolyte 24, and a cathode electrode 26. The anode electrodes 22 of all but one of the fuel cells 20, on each of the surfaces 16 and 18, are electrically connected to the cathode electrode 26 of an adjacent fuel cell 18 by a respective one of a plurality of interconnectors 28.

Each hollow member 14 has a passage 32 extending longitudinally through the hollow member 14, for the supply of fuel to the solid oxide fuel cells 20. The fuel diffuses through the hollow members 14 to the anode electrodes 22 of the fuel cells 20. The passage 32 in each hollow member 14 has a uniform cross-sectional area throughout its length.

Each module 12 has a first end 34 and a second end 36 and the modules 12 are arranged such that the first end 34 of a first one of the modules 12A is connected to a fuel supply manifold 38. The second end 36 of a second one of the modules 12B is connected to a fuel removal manifold 40, as shown in FIG. 1. The first end 34 of each of the modules 12C and module 12B is connected to the second end 36 of an adjacent one of the modules 12C and 12A by a respective one of a plurality of connectors 42. The connectors 42 are formed of a metal or a ceramic with a similar, preferably the same, coefficient of thermal expansion as the hollow members 14, as shown in FIG. 1.

Thus each module 12 is arranged such that the surfaces 16 and 18 of the hollow member 14 are substantially parallel and spaced apart. The modules 12 are arranged such that the surfaces 16 and 18 of adjacent modules 12 are substantially parallel and spaced apart. Additionally, it is to be noted that the modules 12 are arranged to form an undulating arrangement of modules 12. Thus it is clear that the fuel flows sequentially through the modules 12A, 12C and 12B from the fuel supply manifold 38 to the fuel removal manifold 40 through a serpentine flow path as shown in FIG. 1.

Additionally air, or oxygen, flows through the space between the modules 12 in a direction perpendicular to the longitudinal direction of the modules 12. One or more damping members 37A, 37B or 37C are preferably positioned at suitable positions between adjacent modules 12.

Each damping member 37A is manufactured from a resilient, spring, material, for example a metal and is formed into a corrugated shape. Each damping member 37A is arranged to abut the surfaces of the adjacent modules 12. The damping member 37A is provided with an electrically insulating coating if it is arranged to abut the fuel cells 20. The damping members 37A also have an additional advantage because they act as flow directors to direct the flow of air, or oxygen, in the required direction across the cathodes 26 of the fuel cells 20.

Each damping member 37B is manufactured from a resilient, spring, material, for example a metal and is formed into a C shape. Each damping member 37B is arranged to abut the surfaces of the adjacent modules 12. The damping member 37B is provided with an electrically insulating coating if it is arranged to abut the fuel cells 20.

Each damping member 37C is manufactured from a resilient, spring, material, for example a woven ceramic cord. Each damping member 37C is arranged to abut the surfaces of the adjacent modules 12. The damping member 37C does not require an electrically insulating coating even if it is arranged to abut the fuel cells 20.

An electrical connection is provided between the solid oxide fuel cells 20 on the surfaces 16 and 18 of each module 12 by providing an electrical connection between the interconnectors 30. In FIG. 3 the fuel cells 20 are arranged symmetrically on each module 12 and a cathode electrode 26 of one of the fuel cells 20 on the surface 16 at the first end 34 of each module 12 electrically connected to a cathode electrode 26 of one of the fuel cells 20 on the surface 18 at the first end 34 of the respective module 12 through the interconnectors 30. The electrical interconnection comprises an electrically conducting band 33 wound around the module 12 and preferably the band 33 comprises platinum. Likewise an anode electrode 22 of one of the fuel cells 20 on the surface 16 at the second end 36 of each module 12 is electrically connected to an anode electrode 22 of one of the fuel cells 20 on the surface 18 at the second end 36 of the respective module 12 through the interconnectors 30. The electrical interconnection again comprises an electrically conducting band wound around the module 12. In this arrangement the solid oxide fuel cells 20 on the surfaces 16 and 18 of each module 12 are electrically connected in electrical parallel using the interconnectors 30 at the first end 34 and the second end 36 of the module 12. Adjacent modules 12 are then connected in electrical series by electrically connecting the interconnectors 30.

In an alternative arrangement, not shown, the anode electrode 22 of one of the fuel cells 20 on each of the surfaces 16 and 18 of each module 12 is electrically connected to a cathode electrode 26 of one of the fuel cells 20 on one of the surfaces 18 and 16 of an adjacent module 12 by a respective one of the interconnectors 30. In this arrangement the solid oxide fuel cells 20 on the surfaces 16 and 18 of adjacent modules 12 are electrically connected in electrical series using the interconnectors 30 at the first end 34 and second end 36 of the module 12.

Figure 4:
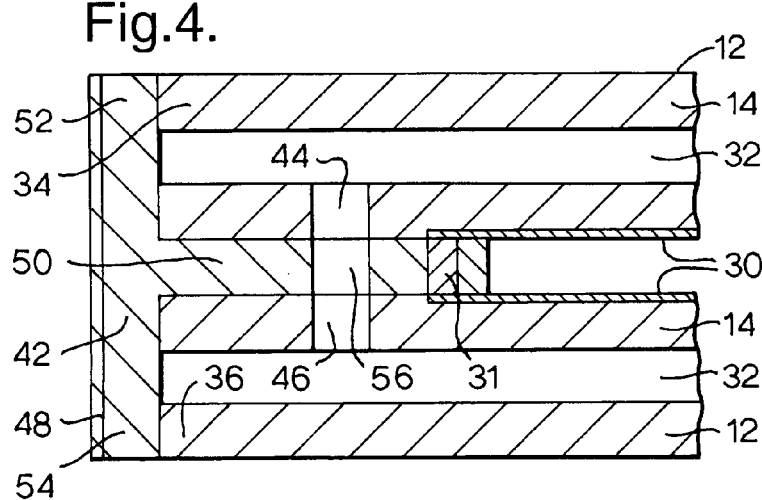
FIG. 4 is an enlarged cross-sectional view of the ends of two adjacent modules and a connector.

The first end 34 of one of the modules 12, the second end 36 of one the modules 12 and a connector 42 are shown in FIG. 4. The first end 34 of one of the modules 12 is provided with one or more apertures 44, which extend through the hollow member 14 towards the adjacent module 12. The second end 36 of one of the modules 12 is provided with one or more apertures 46. The number of apertures 46 provided in the second end 36 of one of the modules 12 may be the same number, or a different number, to the number of apertures 44 as are provided in the first end 34 of the other module 12. The apertures 46 extend through the hollow member 14 towards the adjacent module 12. The apertures 44 and 46 in the modules 12 are aligned.

The connector 42 is substantially T-shaped member 48, which comprises a stem 50 and flanges 52 and 54 at one end of the stem 50. The T-shaped member 48 may comprise one, two or three pieces. For example the stem 50 and flanges 52 and 54 may be the three separate pieces. The member 48 is arranged such that the stem 50 of the member 48 is positioned between the ends 34 and 36 of the modules 12. The member 48 has a number of apertures 56 extending through the stem 50. The number of apertures 56 provided in the member 48 may be the same number, or a different number, to the number of apertures 44 and 46 that are provided in the first end 34 and the second end 36 of the other module 12.

The member 48 separates the ends 34 and 36 of the adjacent modules 12 and bonds, and seals, the ends 34 and 36 of the adjacent modules 12 together. The apertures 44, 46 and 56 allow fuel to flow from the passage 32 in one module 12 sequentially through the apertures 44, 56 and 46 to the passage 32 in an adjacent module 12. The flanges 52 and 54 at the end of the stem 50 provide additional support for the modules 12 and may seal the ends 34 and 36 of the modules 12. The apertures 44, 46 and 56 are of any suitable shape or size, for example circular apertures or slots.

The flanges 52 and 54 at the end of the stem 50 of the connector 42 may not be co-linear so that the ends of the modules 12 are not completely in alignment.

Electrical conductors 31 extend through the stem 50 to interconnect the interconnector 30 associated with the solid oxide fuel cells 20 on one module 12, and the interconnector 30 associated with the solid oxide fuel cells 20 on the adjacent module 12.

Figure 5:
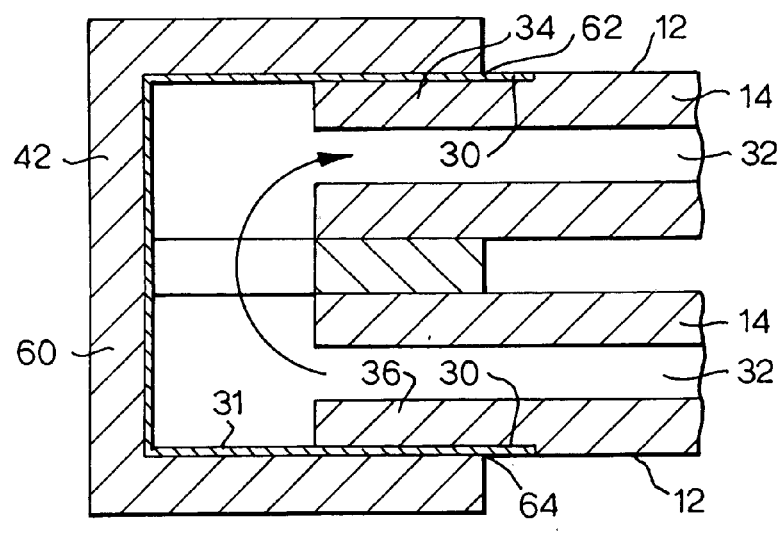
FIG. 5 is an enlarged cross-sectional view of the ends of two adjacent modules and an alternative connector.

The first end 34 of one of the modules 12, the second end 36 of one the modules 12 and an alternative connector 42 are shown in FIG. 5. The first end 34 of one of the modules 12 extends into the connector 42 and the second end 36 of one of the modules 12 extends into the connector 42. The ends 34 and 36 are sealed to the connector 42.

The connector 42 comprises a hollow member 60, which has two parallel slots 62 and 64 in which the first end 34 of one of the modules 12 and the second end 36 of one of the modules 12 locate. The ends 34 and 36 of the modules 12 are open to allow fuel to flow from the passage 32 in one module 12 through the end 36 of the module 12, to turn through 180° in the connector 42 and to flow through the end 34 of the adjacent module 12 into the passage 32 of the adjacent module 12.

Electrical conductors 31 extend along the inner surface of the connector 42 to interconnect the interconnector 30 associated with the solid oxide fuel cells 20 on one module 12 with the interconnector 30 associated with the solid oxide fuel cells 20 on the adjacent module 12. The electrical connection in the connector 42 shown in FIG. 4 may also be applied to the connector 42 shown in FIG. 5. The connector 42 shown in FIG. 5 may have either one or both of the electrical connections shown in FIGS. 4 and 5.

Figure 6:
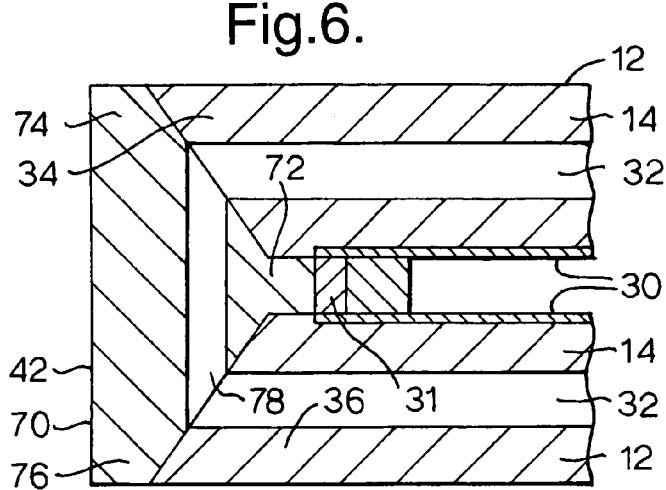
FIG. 6 is an enlarged cross-sectional view of the ends of two adjacent modules and an alternative connector.

The first end 34 of one of the modules 12, the second end 36 of one the modules 12 and a further connector 42 are shown in FIG. 6.

The connector 42 comprises a substantially T-shaped member 70, which comprises a stem 72 and flanges 74 and 76 at one end of the stem 72. The member 70 is arranged such that the stem 72 of the member 70 is positioned between the ends 34 and 36 of the modules 12. The flanges 74 and 76 have a maximum thickness adjacent the stem 72 and decrease in thickness from the stem 72 to forming tapering surfaces. The tapering surfaces may be at any suitable angle, preferably at an angle in the range 30° to 60°, for example 45°. The ends 34 and 36 of the modules 12 also have surfaces tapering at any suitable angle to abut the flanges 74 and 76. One or more apertures 78 extend through the member 70 between the tapering surfaces of the flanges 74 and 76. This arrangement allows the member 70 and the elongate hollow member 14 to have different coefficients of thermal expansion if the bonding material is able to carry shear stresses.

The member 70 separates the ends 34 and 36 of the adjacent modules 12 and bonds, and seals, the ends 34 and 36 of the adjacent modules 12 together. The apertures 78 allow fuel to flow from the passage 32 in one module 12 through the apertures 78 to the passage 32 in an adjacent module 12. The flanges 74 and 76 at the end of the stem 72 provide additional support for the modules 12 and seal the ends 34 and 36 of the modules 12. The apertures 78 are of any suitable shape or size, for example circular apertures or slots.

The flanges 74 and 76 at the end of the stem 72 of the connector 42 may not be co-linear so that the ends of the modules 12 are not completely in alignment.

Electrical conductors 31 extend through the stem 72 to interconnect the interconnector 30 associated with the solid oxide fuel cells 20 on one module 12 with the interconnector 30 associated with the solid oxide fuel cells 20 on the adjacent module 12.

The hollow members 14 are preferably rectangular in cross-section and have rectangular or round ends. The number of hollow members 14 is between 2 and 20. The hollow members 14 have a length between 50 mm and 2000 mm, a width of 20 mm to 300 mm and a thickness of up to 30 mm. The maximum thickness is preferably 10 mm, the minimum thickness is preferably 1 mm and more preferably the minimum thickness is 3 mm, however a smaller thickness may be possible.

The main advantage of this arrangement of the modules is that thermal and mechanical stresses in the solid oxide fuel cell stack are reduced, preferably minimised. In particular it allows for the build up of manufacturing tolerances and thermal strains, due to thermal gradients and thermal cycling, in the solid oxide fuel cell stack 10 by allowing compliance, or flexibility, between the modules 12. The stresses are distributed through the connections between the modules and through the modules themselves. The durability of the solid oxide fuel cell stack is improved. Also a relatively high packing density of modules/solid oxide fuel cells is possible.

Alternatively the electrical conductors 30 may extend along the outer surface of the connector 42.

Figure 7:
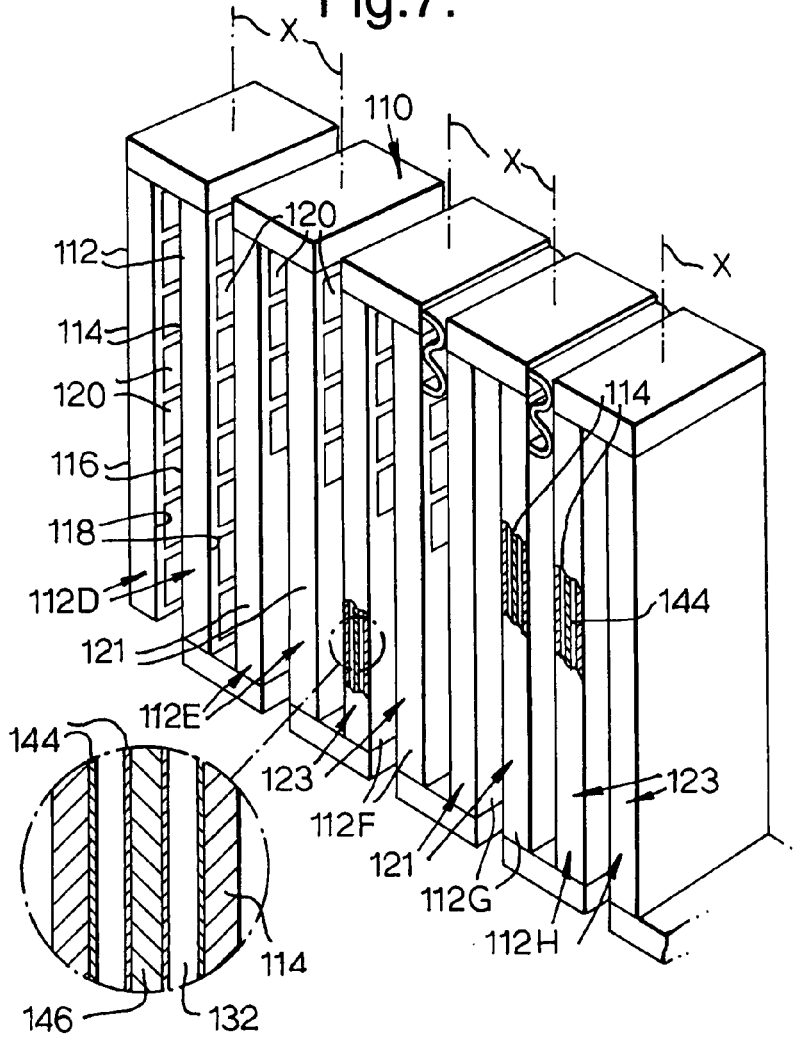
FIG. 7 is a partially cut away perspective view of an alternative solid oxide fuel cell stack according to the present invention.

An alternative solid oxide fuel cell stack 110, as shown in FIG. 7, is substantially the same as the solid oxide fuel cell stack 10 shown in FIG. 1. The solid oxide fuel cell stack 110 comprises a plurality of modules 112. Each module 112 comprises an elongate hollow member 114. The hollow members 114 are manufactured from fully or partially stabilised zirconia, alumina, silicon carbide or other suitable ceramic material. Each hollow member 114 has two parallel surfaces 116 and 118. The hollow members 114 are porous to allow fuel to flow to the solid oxide fuel cells.

Some of the modules 112D have solid oxide fuel cells 120 arranged on all of both of the surfaces 116 and 118. Some of the modules 112E have solid oxide fuel cells 120 arranged on both of the surfaces 116 and 118 of one half of the module 112E. Both of the surfaces 116 and 118 on the remaining half of the module 112E act as heat exchangers 121 to dissipate heat. Some of the modules 112F have solid oxide fuel cells 120 arranged on both of the surfaces 116 and 118 of one half of the module 112F. The remaining half of the module 112F has a catalyst 144 arranged in the passage 132 to act as reformers 123 for reforming the fuel. Some of the modules 112G have no solid oxide fuel cells and the modules 112G act as a heat exchanger 121. Some of the modules 112H have no solid oxide fuel cells and the modules 112H have a catalyst 144 arranged in the passages 132 to act as reformers 123 for reforming the fuel.

The passages 132 of the modules 112F and modules 112H may have a catalyst 144 applied to the surfaces of the passages 132, or a catalyst 144 may be applied to a member 146 positioned within the passages 132. The member 146 may be a spirally wound wire. Alternatively the member 146 may be arranged and configured to define a helical flow path through the respective passage 132 with the hollow member 114. The member 146 is manufactured, for example by twisting the ends of an elongate resilient member to form a helical passage. The member 146 also aids heat and mass transfer.

Figure 8:
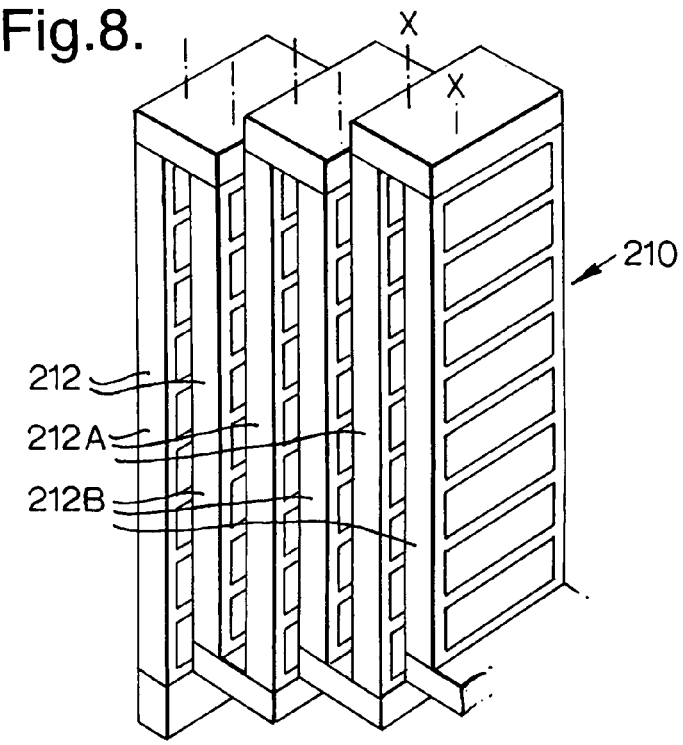
FIG. 8 is a partially cut away perspective view of a further solid oxide fuel cell stack according to the present invention.

An alternative solid oxide fuel cell stack 210, as shown in FIG. 8, is substantially the same as the solid oxide fuel cell stack 10 shown in FIG. 1. The solid oxide fuel cell stack 210 comprises a plurality of modules 212. The modules 212 are arranged such that the adjacent ones of the modules 212A and 212B have different lengths and alternate ones of the modules 212A, or modules 212B, have the same length to produce a stepped arrangement.

Figure 9:
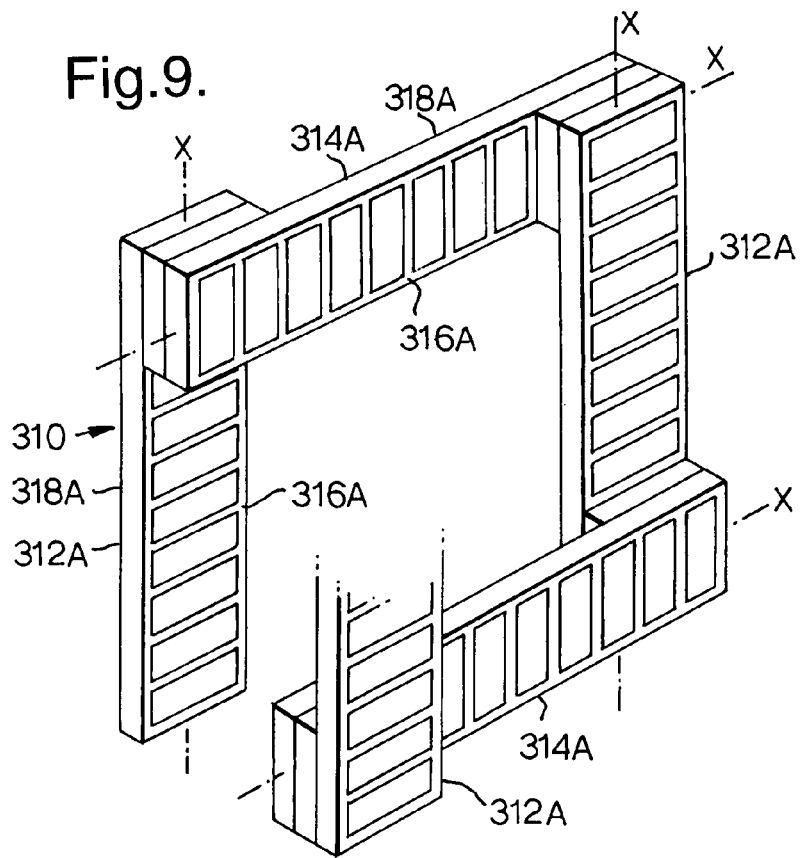
FIG. 9 is a partially cut away perspective view of a further solid oxide fuel cell stack according to the present invention.

A further alternative solid oxide fuel cell stack 310, as shown in FIG. 9, is similar to the solid oxide fuel cell stack 10 shown in FIG. 1. The solid oxide fuel cell stack 310 comprises a plurality of modules 312. The modules 312 are arranged such that the adjacent ones of the modules 312A and 312B are arranged differently to those in FIG. 1.

In FIG. 1 the surfaces 16 and 18 of the adjacent modules 12A and 12B are arranged substantially parallel to each other and the centre lines X of the adjacent modules 12A and 12B extend longitudinally in substantially the same direction and in the same plane. Thus in adjacent modules 12A and 12C the fuel flows in opposite directions but in parallel planes and the fuel flow turns through 180° in the connectors.

In FIG. 9 the surfaces 316 and 318 of the adjacent modules 312A and 312B are arranged substantially parallel to each other and the centre lines X of adjacent modules 312A and 312B extend longitudinally in different directions, or at different angles. In FIG. 9 the adjacent modules 312A and 312B are arranged to extend longitudinally perpendicularly to each other and alternate modules 312A or 312B are arranged to extend longitudinally in substantially the same direction to form a rectangular arrangement of modules 312. Thus in adjacent modules 312A and 312B the fuel flows in perpendicular directions in parallel planes and the fuel flow turns through 90° in the connectors.

It is equally possible to arrange for adjacent modules to be arranged at any other suitable angle, for example 72° to form a pentagonal arrangement of modules, 60° to form a hexagonal arrangement of modules or 45° to form an octagonal arrangement of modules. Thus in adjacent modules the fuel flows at appropriate angles but in parallel planes.

Thus the modules 312 are arranged to form a helical arrangement. It may be possible to arrange for two helical arrangements of modules to be arranged around the same axes and to be interdigitated.

Although the present invention has been described with reference to a plurality of solid oxide fuel cells arranged in series on the surfaces of the elongate hollow members of the modules other suitable arrangements of solid oxide fuel cells may be possible.

Although the present invention has described the anode electrodes of the solid oxide fuel cells being arranged on the surfaces of the elongate hollow members of the modules it is equally possible to arrange the cathode electrodes of the solid oxide fuel cells on the surfaces of the elongate hollow members of the modules.

Although the present invention has described the passages in each elongate hollow member having a uniform cross-sectional area throughout its length, it may be possible for one or more of the elongate hollow members to have a varying cross-sectional area, a non-uniform cross-sectional area, throughout its length. The non-uniform passage may be a converging passage or a diverging passage. The converging passage accelerates the flow in the direction of flow of the reactant and the diverging passage diffuses the flow in the direction of flow of the reactant.

The invention claimed is:

1. A solid oxide fuel cell stack comprising:
 a plurality of modules, each module comprising an elongate hollow member, each hollow member having at least one passage extending longitudinally through the hollow member for the flow of a reactant, each hollow member having two parallel walls defining the passage, each wall having a flat exterior surface, at least one of the modules including a plurality of solid oxide fuel cells, the solid oxide fuel cells being arranged on at least one of the flat exterior surfaces of the at least one module, the exterior surfaces of adjacent modules being arranged substantially parallel and spaced apart, wherein the walls are porous so that during operation fuel flows through the walls to contact the solid oxide fuel cells; and
 at least one connector connecting an end of a first module to an end of a second module to allow reactant to flow sequentially through the passages in each of the modules and such that thermal and mechanical stresses in the solid oxide fuel cell stack are reduced.

2. A solid oxide fuel cell stack as claimed in claim 1, further comprising a manifold for the supply of a reactant and a manifold for the removal of the reactant, each module having a first end and a second end, the first end of a first one of the modules being connected to the manifold for the supply of reactant to the passage of a first one of the modules, the second end of a second one of the modules being connected to the manifold for the removal of reactant from the passage of the second one of the modules, the second end of the first one of the modules being connected to the first end of a first adjacent module by the at least one connector, the first end of the second one of the modules being connected to the second end of a second adjacent module by another at least one connector, and passages of adjacent modules being connected by associated connectors, wherein the connector at the second end of the first one of the modules is the only connection between the passages of the first module and the first adjacent module and the connector at the first end of the second one of the modules is the only connection between the passages of second module and the second adjacent module.

3. A solid oxide fuel cell stack as claimed in claim 1, wherein each hollow member has a plurality of passages.

4. A solid oxide fuel cell stack as claimed in claim 1 wherein at least one hollow member has a different length to the remainder of the hollow members.

5. A solid oxide fuel cell stack as claimed in claim 1 wherein each module includes a plurality of solid oxide fuel cells.

6. A solid oxide fuel cell stack as claimed in claim 1 wherein at least one of the modules comprises a heat exchanger.

7. A solid oxide fuel cell stack as claimed in claim 1 wherein at least one of the modules comprises a fuel reformer.

8. A solid oxide fuel cell stack as claimed in claim 7 wherein the at least one module has a catalyst arranged in the at least one passage through the hollow member.

9. A solid oxide fuel cell stack as claimed in claim 8 wherein the catalyst is arranged on the surfaces of the at least one passage through the hollow member.

10. A solid oxide fuel cell stack as claimed in claim 1 wherein a member is arranged in the at least one passage through the hollow member.

11. A solid oxide fuel cell stack as claimed in claim 10 wherein the member is a coil of wire.

12. A solid oxide fuel cell stack as claimed in claim 10 wherein the member is arranged and configured to define a helical flow path through the with the hollow member.

13. A solid oxide fuel cell stack as claimed in claim 10, wherein a catalyst is arranged on the member.

14. A solid oxide fuel cell stack as claimed in claim 1 wherein each module is connected to an adjacent module by an end cap.

15. A solid oxide fuel cell stack as claimed in claim 1 wherein centre lines of adjacent modules are arranged substantially in the same plane to form an undulating arrangement of modules.

16. A solid oxide fuel cell stack as claimed in claim 1 wherein the centre lines of adjacent modules are arranged in different planes to form a helical arrangement of modules.

17. A solid oxide fuel cell stack as claimed in claim 16 wherein centre lines of adjacent modules are arranged at any one of angles 45°, 60°, 72°, or 90°.

18. A solid oxide fuel cell stack as claimed in claim 1 wherein at least one damping member is arranged between adjacent modules.

19. A solid oxide fuel cell stack as claimed in claim 18 wherein the damping member is a resilient corrugated member, or a resilient C shaped member.

20. A solid oxide fuel cell stack as claimed in claim 18 wherein the damping member is metallic.

21. A solid oxide fuel cell stack as claimed in claim 20 wherein the damping member has an electrically insulating coating.

22. A solid oxide fuel cell stack as claimed in claim 1 wherein each solid oxide fuel cell comprises an anode electrode, a cathode electrode and a solid oxide electrolyte.

23. A solid oxide fuel cell stack as claimed in claim 1 wherein the at least one passage of at least one of the elongate hollow members has a varying cross-sectional area throughout its length.

24. A solid oxide fuel cell stack as claimed in claim 1 wherein the connector comprises a substantially T-shaped member having a stem and flanges at one end of the stem, the stem of the T-shaped member is positioned between the ends of the modules, the T-shaped member separates the ends of the adjacent modules and bonds, and seals the ends of the adjacent modules together.

25. A solid oxide fuel cell stack as claimed in claim 24 wherein the T- shaped member has a plurality of apertures extending through the stem, the apertures allowing reactant to flow from the passage in one module sequentially through the apertures to the passage in an adjacent module.

26. A solid oxide fuel cell stack as claimed in claim 24 wherein the flanges have a maximum thickness adjacent the stem and decrease in thickness from the stem forming tapering surfaces and the ends of the modules have tapering surfaces to abut the flanges.

27. A solid oxide fuel cell stack as claimed in claim 26 wherein at least one aperture extends through the T-shaped member between the tapering surfaces of the flanges, the at least one aperture allowing reactant to flow from the passage in one module through the apertures to the passage in an adjacent module.

28. A solid oxide fuel cell stack as claimed in claim 1 wherein the connector comprises a hollow member having two parallel slots in which the first end of one of the modules and the second end of one of the modules locate, the ends of the modules are open to allow reactant to flow from the passage in one module through the end of the module, to turn through 180° in the connector and to flow through the end of the adjacent module into the passage of the adjacent module.

29. A solid oxide fuel cell stack as claimed in claim 1, wherein solid oxide fuel cells are present on both flat exterior surfaces of the modules.

30. A solid oxide fuel cell stack comprising a plurality of modules, each module comprising an elongate hollow member, each hollow member having at least one passage extending longitudinally through the hollow member for the flow of a reactant, each hollow member having two parallel flat surfaces, at least one of the modules including a plurality of solid oxide fuel cells, the solid oxide fuel cells being arranged on at least one of the flat surfaces of the at least one module, the surfaces of adjacent modules being arranged substantially parallel and spaced apart, characterized in that at least one end of each module is connected to an end of an adjacent module by a connector to allow reactant to flow sequentially through the modules and such that thermal and mechanical stresses in the solid oxide fuel cell stack are reduced, wherein the at least one module includes a plurality of fuel cells on both of the flat surfaces of the module.

31. A solid oxide fuel cell stack comprising a plurality of modules, each module comprising an elongate hollow member, each hollow member having at least one passage extending longitudinally through the hollow member for the flow of a reactant, each hollow member having two parallel flat surfaces, at least one of the modules including a plurality of solid oxide fuel cells, the solid oxide fuel cells being arranged on at least one of the flat surfaces of the at least one module, the surfaces of adjacent modules being arranged substantially parallel and spaced apart, characterized in that at least one end of each module is connected to an end of an adjacent module by a connector to allow reactant to flow sequentially through the modules and such that thermal and mechanical stresses in the solid oxide fuel cell stack are reduced wherein each solid oxide fuel cell comprises an anode electrode, a cathode electrode and a solid oxide electrolyte, wherein the anode electrodes are arranged on the flat surfaces of the elongate hollow member.

* * * * *